(12) United States Patent
Sano et al.

(10) Patent No.: US 10,480,987 B2
(45) Date of Patent: Nov. 19, 2019

(54) CALIBRATING AN ELECTROMECHANICAL FILL-LEVEL MEASURING DEVICE

(71) Applicant: Endress + Hauser GmbH + Co. KG, Maulburg (DE)

(72) Inventors: Masashi Sano, Yamanashi (JP); Andreas Kaiser, Todtnau (DE); Yoichi Kamei, Yamanashi (JP)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 177 days.

(21) Appl. No.: 15/509,577

(22) PCT Filed: Aug. 19, 2015

(86) PCT No.: PCT/EP2015/069047
§ 371 (c)(1),
(2) Date: Mar. 8, 2017

(87) PCT Pub. No.: WO2016/037815
PCT Pub. Date: Mar. 17, 2016

(65) Prior Publication Data
US 2017/0254693 A1 Sep. 7, 2017

(30) Foreign Application Priority Data
Sep. 11, 2014 (DE) .................. 10 2014 113 081

(51) Int. Cl.
*G01F 25/00* (2006.01)
*G01F 23/00* (2006.01)
(52) U.S. Cl.
CPC ...... *G01F 25/0061* (2013.01); *G01F 23/0023* (2013.01)
(58) Field of Classification Search
USPC ........................................................ 73/1.73
See application file for complete search history.

(56) References Cited

U.S. PATENT DOCUMENTS 4,244,219 A * 1/1981 Takahashi ............. G01F 23/443
318/482
4,387,778 A * 6/1983 Wohrl ....................... G01G 5/02
177/207
(Continued)

FOREIGN PATENT DOCUMENTS

DE 819923 C 11/1951
DE 7031884 U 11/1970
(Continued)

OTHER PUBLICATIONS

German Search Report, German Patent Office, Munich, DE—dated Jun. 18, 2015.
(Continued)

*Primary Examiner* — Natalie Huls
*Assistant Examiner* — Mohammed E Keramet-Amircolai
(74) *Attorney, Agent, or Firm* — Bacon & Thomas, PLLC

(57) ABSTRACT

An electromechanical fill-level measuring device comprising at least one displacement element, which is connected by means of a measurement wire windably at least with a measurement drum, at least one measuring shaft, with which the measurement drum is mechanically fixedly connected, wherein the shaft is held rotatably in at least one rotary bearing, at least one weight measuring system, which ascertains the effective weight of the displacement element and the measurement wire, and at least one servomotor, which is coupled with the measuring shaft and which rotates the measuring shaft corresponding to an ascertained weight measurement, so that an ascertaining of the relative movement of the measurement drum produced by a change of the liquid level to be measured is provided. The invention provides that a calibration mode of the weight measuring system of the electromechanical fill-level measuring device is provided, in which freely hanging displacement elements with defined mass are provided for ascertaining their (Continued)

weights on the measurement wire, after each change of the freely hanging displacement elements with defined mass a predefined rotational movement of the measurement drum is provided, and their ascertained weights are provided as a calibration values for the weight measuring system.

11 Claims, 2 Drawing Sheets

(56) References Cited

U.S. PATENT DOCUMENTS

| | | | | |
|---|---|---|---|---|
| 4,422,328 | A * | 12/1983 | Luchessa | G01F 23/44 335/206 |
| 4,786,846 | A * | 11/1988 | Uchida | G01F 23/46 318/482 |
| 5,012,589 | A * | 5/1991 | Remion | G01F 23/0023 318/482 |
| 5,533,392 | A * | 7/1996 | Kira | G01F 23/0023 33/720 |
| 2002/0029633 | A1 * | 3/2002 | Yekutiely | G01F 23/0023 73/309 |
| 2004/0093943 | A1 * | 5/2004 | Arias | G01F 23/24 73/304 C |
| 2005/0083229 | A1 * | 4/2005 | Edvardsson | G01F 23/284 342/124 |
| 2013/0036816 | A1 * | 2/2013 | Urban | G01F 23/296 73/32 A |
| 2013/0139585 | A1 * | 6/2013 | D'Angelico | G01F 23/2966 73/290 V |
| 2013/0269432 | A1 * | 10/2013 | Brutschin | G01F 23/44 73/313 |

FOREIGN PATENT DOCUMENTS

| | | |
|---|---|---|
| DE | 2151094 A1 | 4/1973 |
| DE | 7329766 U | 11/1973 |
| DE | 2659416 A1 | 7/1977 |
| DE | 2853360 A1 | 7/1979 |
| DE | 2401486 B2 | 2/1980 |
| DE | 3721164 A1 | 1/1988 |
| DE | 3942239 A1 | 7/1991 |
| DE | 69205817 T2 | 4/1996 |
| DE | 19543352 A1 | 1/1997 |
| DE | 19730196 A1 | 2/1999 |
| DE | 102012102658 A1 | 7/2013 |
| DE | 102014113081 A1 | 3/2016 |

OTHER PUBLICATIONS

English Translation of the International Preliminary Report on Patentability, WIPO, Geneva, CH—dated Mar. 23, 2017.
International Search Report, EPO, The Netherlands—dated Nov. 27, 2015.

* cited by examiner

CALIBRATING AN ELECTROMECHANICAL FILL-LEVEL MEASURING DEVICE

TECHNICAL FIELD

The invention relates to an electromechanical fill-level measuring device comprising at least one displacement element, which is connected by means of a measurement wire windably at least with a measurement drum, at least one measuring shaft, with which the measurement drum is mechanically fixedly connected, wherein the shaft is held rotatably in at least one rotary bearing, at least one weight measuring system, which ascertains the effective weight of the displacement element and of the measurement wire, and at least one servomotor, which is coupled with the measuring shaft and which rotates the measuring shaft corresponding to an ascertained weight measurement, so that an ascertaining of the relative movement of the measurement drum produced by a change of the liquid level to be measured is provided.

BACKGROUND DISCUSSION

Methods and apparatuses for fill level measurement, which work according to the sounding principle, are sufficiently known. For example, described in the documents, German patents, DE 21 51 094, DE 24 01 486 B2, DE-patent 819 923, and DE 39 42 239 A1; U.S. Pat. No. 3,838,518, German patents, DE 195 43 352 A1, G 70 31 884.2, DE-patent 819 923, G 73 29 766.2, and DE 19730196 A1; as well as German patent, DE 28 53 360 A1 are fill level measuring systems for highly accurate fill level determination based on the sounding principle. In the case of these methods for fill level measurement according to the sounding principle, a plumb bob hanging on a measuring line descends toward the fill substance, respectively bulk good. Upon striking the fill substance, the length of the measuring cable wound off of the cable drum is ascertained and the fill level height, respectively the fill quantity, displayed on a display device. For different fill substances, differently suitable plumb bobs are applied.

The main field of application of electromechanical sounding is for fill level measurement in the case of very high containers, where solutions with other measuring principles are very costly or not possible because of physical reasons. With electromechanical sounding, fill levels in containers are measurable currently up to, for instance, 70 m in height with an accuracy of under a millimeter.

Other apparatuses for liquid level measurement and density determination, which work according to the displacement measuring principle, are known from German patents, DE 37 21164 A1, DE2853360A1, DE 2401486 B2 and DE 2659416 A1.

Known from DE 37 21164 A1 is a fill-level measuring device, which contains a float on a wire, which floats on the surface of a liquid (not shown). The wire is wound on a drum and can be wound onto or off of the drum by means of the rotational movement of a measuring shaft connected with the drum. Connected with the base of the drum is a measuring shaft. If the liquid level, on which the float floats, changes, then also the stress exerted by the wire on the drum changes therewith. This change of the stress exerted by the wire is converted via an outer magnetic ring acting as a coupling part into a torque of the measuring shaft. The cylindrical, outer magnetic ring is connected with the base in the interior of the drum. Magnetic poles, south- and north poles, are arranged alternately in the circumferential direction of the outer magnetic ring. Alternately embodied on the inner magnetic ring connected with the measuring shaft are magnetic north- and south poles in number equal to those of the outer magnetic ring. An electromagnetic transducer, e.g. a Hall element, is arranged on the outer periphery of the inner magnetic ring in the boundary region between different magnetic poles. If there is produced in the case of a change of the liquid level to be measured a force, which causes a relative movement between the outer and inner magnetic rings, then a change of the magnetic flux present between the outer and inner magnetic rings effects in the electromagnetic transducer an electrical signal, by which the measuring shaft is so rotated that the relative movement between the inner and outer magnetic rings is brought back to zero and, from this, a measured value of the achieved liquid level is won.

In order to calibrate the weight measuring system in the case of such electromechanical fill level measurement devices, in a calibration mode, a known, freely hanging weight, respectively a displacement element not located in the medium, with a defined weight is hung on the measurement wire and its weight ascertained. However, measurement errors can occur in the calibration mode due to tension forces from the attaching of the displacement element or the weight to the measurement wire or due to tribological properties of the measurement mechanism.

SUMMARY OF THE INVENTION

An object of the invention is to provide apparatus and method for calibrating an electromechanical fill-level measuring device, which improve mechanical measuring sensitivity and accuracy of measurement, prevent measurement errors in the calibration mode and are simple to implement.

The object is achieved by an electromechanical fill-level measuring device comprising at least one displacement element, which is connected by means of a measuring wire windably at least with a measurement drum, at least one measuring shaft, with which the measurement drum is mechanically fixedly connected, wherein the shaft is held rotatably in at least one rotary bearing, at least one weight measuring system, which ascertains the effective weight of the displacement element and the measurement wire, and a servomotor, which is coupled with the measuring shaft and which rotates the measuring shaft corresponding to an ascertained weight measurement, so that an ascertaining of the relative movement of the measurement drum produced by a change of the liquid level to be measured is provided, wherein a calibration mode of the weight measuring system of the electromechanical fill-level measuring device is provided, in which freely hanging displacement elements with defined mass are provided for ascertaining their weights on the measurement wire, after each change of the freely hanging displacement elements with defined mass a predefined rotational movement of the measurement drum is provided, and their ascertained weights are provided as calibration values for the weight measuring system.

In an advantageous embodiment of the invention, a displacement element with a defined first mass is provided on the measurement wire.

In a further development of the invention, the freely hanging measurement wire without a displacement element hung thereon is provided as a second mass.

In an advantageous further development, a displacement element with a defined second mass, which is different from the first mass, is provided on the measurement wire.

In an advantageous embodiment of the invention, the predefined rotational movement of the measurement drum is provided in both rotational directions.

In an additional embodiment, the predefined rotational movement of the measurement drum is provided with a defined angular velocity, a defined angular acceleration and/or a defined rotated distance.

In a further embodiment, an algorithm is provided at least in the calibration mode of the weight measuring system of the electromechanical fill-level measuring device for compensating and for calculating out of the current ascertaining of the weight the frictional force of the rotary bearing of the measuring shaft of the measurement drum.

The object is achieved, furthermore, by a method for calibrating the weight measuring system of an electromechanical fill-level measuring device, wherein freely hanging displacement elements with defined mass are hung on the measurement wire for ascertaining their weight, after each change of the freely hanging displacement elements with predefined mass a predefined rotational movement of the measurement drum is performed, and the ascertained weights are used as calibration values for the weight measuring system.

In a special embodiment of the method, the measurement drum is rotated by means of the predefined rotational movement in at least one or in both rotational directions with a defined angular velocity, a defined angular acceleration and/or a defined rotated distance.

In an advantageous further development of the method, an algorithm is used at least in the calibration mode of the weight measuring system of the electromechanical fill-level measuring device for compensating the frictional force of the rotary bearing of the measuring shaft of the measurement drum and calculating the frictional force out of the current ascertaining of the weight.

In a further development of the method, the frictional force of the rotary bearing of the measuring shaft of the measurement drum is calculated out of the current ascertaining of the weight by the algorithm at least in the calibration mode of the weight measuring system of the electromechanical fill-level measuring device by ascertaining the weight difference in both rotational directions of the predefined rotational movement of the measurement drum and ascertaining the frictional force from this weight difference.

Other details, features and advantages of the subject matter of the invention result from the following description with the associated drawings, in which preferred examples of embodiments of the invention are shown. In the examples of embodiments of the invention shown in the figures, elements, which correspond in their construction and/or in their function, are, in the interest of perspicuity and simplification, provided with equal reference characters. The figures of the drawing show as follows:

DETAILED DISCUSSION IN CONJUNCTION WITH THE DRAWINGS

Figure 1:
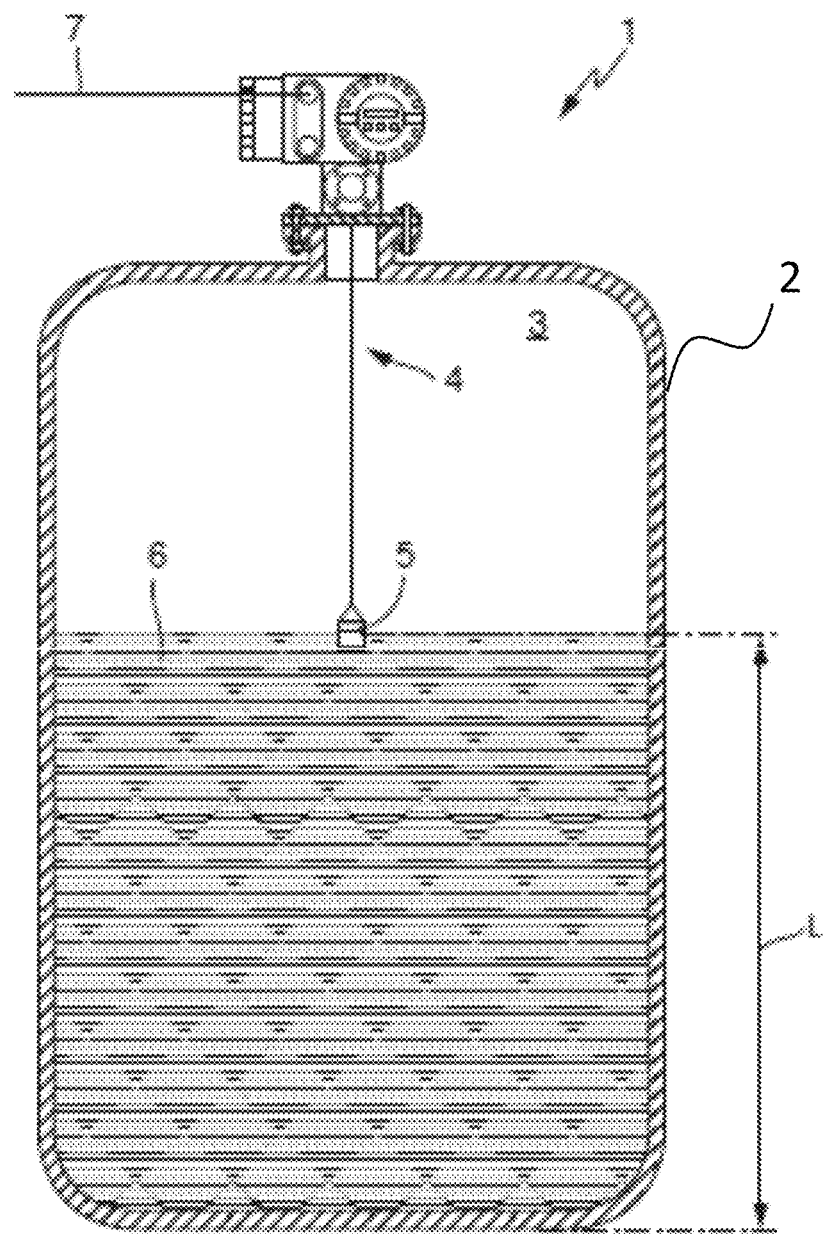
FIG. 1 is an example of an embodiment of a measuring device for ascertaining fill level using the displacement measuring principle.

FIG. 1 shows a mechanical fill-level measuring device 1 corresponding, for example, to the tank measuring system marketed by the company, Endress+Hauser, under the designation PROSERVO NMS 53x and based on the principle of displacement measurement of a displacement element 5. The small displacement element 5 is with the assistance of a servomotor positioned on a measuring line 4 precisely at a limit position of an equilibrium volume in the liquid 6 in the container 2. As soon as the fill level L of the liquid 6 in the container 2 rises or falls, the position of the displacement element 5 with the defined equilibrium volume is adjusted by the servomotor by turning the measuring shaft 9 with the measurement drum 8. The rotation of the measurement drum 8 is evaluated, in order to ascertain the fill level L. Also, the ascertaining of further measured variables, such as interface- and density measurement of the individual layers of the fill substance 6, can be performed with this measuring principle.

In modern industrial plants, field devices are, as a rule, connected via fieldbus systems 7, such as, for example, PROFIBUS® PA, FOUNDATION FIELDBUS® or HART® systems, with at least one superordinated control unit (not shown). Data communication controlled by the control unit on the fieldbus system 7 can occur both by wire as well as also wirelessly. Normally, the superordinated control unit is a PLC (programmable logic controller) or a DCS (Distributed Control System). The superordinated control unit serves for process control, for process visualizing, for process monitoring as well as for start-up and servicing of the field devices.

Figure 2:
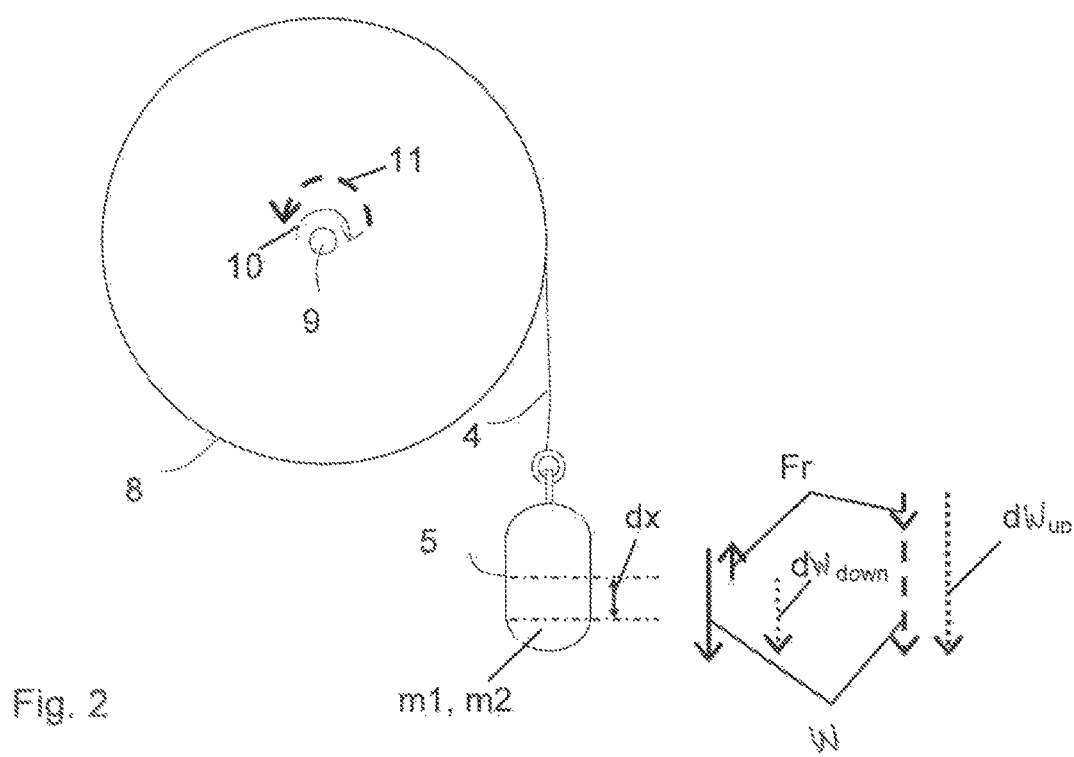
FIG. 2 is a side view of a subsection of an electromechanical fill-level measuring device.
Figure 3:
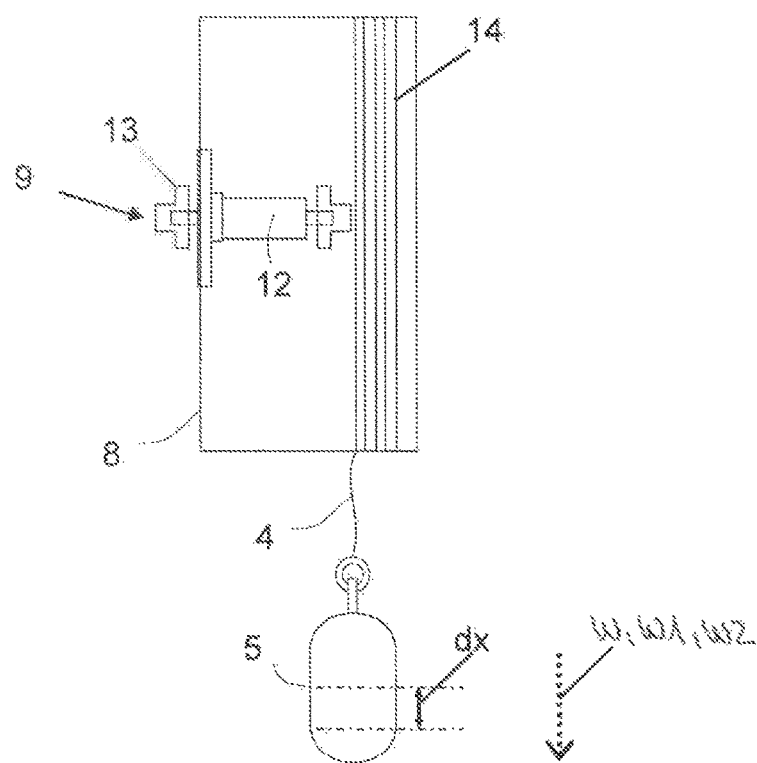
FIG. 3 is a front view of a subsection of the electromechanical fill-level measuring device of the invention.

Shown in FIGS. 2 and 3 are different views of a subsection of the electromechanical fill-level measuring device 1 of the invention, which works according to the displacement principle of a displacement element, respectively float, 5. The displacement element, respectively the float, 5 is secured on an end of a measurement cable, respectively measurement wire, 4 and the other end of the measurement wire 4 is wound as one ply on an external cable drum, respectively the measurement drum 8.

A small displacement element 5 is positioned with the assistance of a small servomotor precisely at the limit position of the equilibrium volume in the liquid, respectively in the liquid fill substance 6. The displacement element 5 hangs on a measurement wire, respectively cable, 4, which is wound on a measurement drum 8, respectively external cable drum, equipped with fine grooves 14 in the housing interior of the fill-level measuring device 1 with constant winding diameter of one ply. The measurement drum 8 is composed, in such case, for example, of an external cable drum, which is coupled via coupling magnets with the internal cable drum. The external and internal cable drums are completely and hermetically sealedly spatially separated from one another by means of the drum housing. The outer magnets are connected with the external cable drum of the measurement drum 8, and the inner magnets with the internal cable drum. When the inner magnets rotate, the magnetic attraction force causes the outer magnets to rotate by following along, so that the entire drum assembly of the measurement drum 8 rotates on the measuring shaft 9.

Due to the weight of the displacement element 5 on the measurement wire 4, a torque acts on the outer magnets, whereby a change of the magnetic flux results. These magnetic field-changes acting between the components of the measuring drums 8 are registered by a special electromagnetic measuring transducer, e.g. a Hall sensor, on the inner measurement drum. The measuring transducer signal of the measuring transducer is further processed by the sensor electronics into a weight measuring system signal. This weight measurement signal is evaluated with the position data signal of an encoder, respectively coder, located on the measuring shaft by a microprocessor in the main electronics and a corresponding motor control signal transmitted to the drive motor. The drive motor is so operated by the motor control signal that the voltage of the measuring transducer produced by the changes of the magnetic flux equals the voltage predetermined by the operation command when the displacement element 5 sinks into the liquid 6 up to the predefined equilibrium volume of the displacement element 5. As a result, the torque in the magnetic coupling between the external cable drum and the internal cable drum changes. This change is measured, for example, by five temperature compensated, Hall detector chips as measuring element. The position data signal, which represents the position of the displacement element 5, is transmitted to the motor control electronics in the main electronics, e.g. a microprocessor. As soon as the level of the liquid 6 rises or falls, the position of the displacement element 5 is adjusted by the drive motor via a transmission. The rotation of the measurement drum 8 is precisely evaluated, in order to ascertain the fill level value L to within an accuracy of +/−0.7 mm.

This embodiment of an electromechanical fill-level measuring device 1 with a sliding contact located on the measuring shaft 10 for transmission of the electrical measuring transducer signal of the electromagnetic measuring transducer in the internal cable drum 13 to the main electronics 7, especially the sensor electronics 8, with the servo motor control electronics, has the disadvantage that the associated mechanical tapping of the measuring transducer signal via sliding contacts involves wear and produces from the associated friction a torque change, so that measurement inaccuracies can occur. Therefore, it is advantageous to use, for example, an inductive, rotary transformer for transmission of the electrical measuring transducer signal.

Furthermore, tribological effects occur, respectively friction in the rotary bearings 13 of the measurement drum 8, whereby hysteresis occurs in the weight determination due to the different sign of the vector of the frictional force Fr depending on rotation direction 10, 11. It is thus important to know the last direction of rotation 10, 11 present after the weight change of the displacement element 5 on the measurement wire 4. For this reason, after the change of the mass m1, m2 of the displacement element 5 on the measurement wire 4, the measurement drum 8 executes a rotational movement 10, 11 in at least one direction of rotation with a defined rotational velocity O and a defined rotated distance dx.

The measurement drum 8, respectively the external cable drum, on which the measurement wire 4 is wound one ply deep in the grooves 14, is held via a measuring shaft 9, respectively rotation axis, in rotary bearings 13. These rotary bearings 13 are, for example, ball bearings or roller bearings, which due to their construction, respectively small contact bearing surface, offer only very little frictional resistance. However, in the calibration mode of the weight measuring system, it is very important to determine the hung weight, for example, a displacement element 5 hanging freely over the fill substance 6, as exactly as possible, since the evaluation algorithm, respectively the evaluating electronics, is calibrated for measurement operation of the fill-level measuring device 1 based on these measured values of the weights. In the calibration mode, for example, two different weights, respectively displacement elements, 5 with different mass m1, m2 are attached by the operator to the measurement wire 4, for example, in the measurement space 3 over the fill substance 6 and the weights W1, W2 ascertained. By means of these measured values of the weights W1, W2, for example, also a linearizing of the measurement curve of the weights W, W1, W2 can be performed.

By this method, the hysteresis caused by the mechanical friction, for example, of the rotary bearings 13, during the weight measuring in the calibration mode is canceled and/or calculated out.

The cable drum, respectively measurement drum, 8 of the electromechanical fill-level measuring device is held by a rotary bearing 13 and a bearing shaft 12. As already described, every rotary bearing 13 has a frictional resistance, which causes a hysteresis error in the weight measuring. If a rotational movement 10 of the measurement drum 8 is executed, in the case of which the displacement element 5 moves downwards toward the fill substance 6 by a predetermined rotated distance dx, the bearing friction force Fr is opposite to the weight W, W1, W2 of the displacement element 5, which points in movement direction. The weight, respectively the weight difference dW, dW1, dW2, $dW_{up}$, $dW_{down}$ can, thus, in the case of rotational movement 10 winding the measurement wire 4 off for lowering the displacement element 5, be determined as follows:

$$dW_{down}=W-Fr$$

If the measurement drum 8 is rotated in the opposite direction of rotation 11 winding up the measurement wire 4, the displacement element 5 is lifted and the frictional force Fr of the rotary bearing 13 adds to the weight W, W1, W2.

$$dW_{up}=W+Fr.$$

In normal measurement operation, this hysteresis error is canceled by the measurement algorithm, in that the frictional force is calculated out, respectively eliminated.

However, during the calibration mode of the weight measuring system of the electromechanical fill-level measuring device 1, this hysteresis error is always present. For this reason, the calibration of the weight measuring system occurs using steps as follows. In the calibration mode of the weight measuring system, on-site, at least two different weights, respectively displacement elements, 5, with different, defined weights, respectively masses m1, m2, are hung on the measurement wire 4 of the measurement drum 8. For example, the displacement element 5 for calibration measurement is removed, this corresponding to a mass m1 of 0 gram, and hung back on, whereby the mass m2 is the mass of the displacement element 5, e.g. 250 gram. Depending on the last performed rotational movement 10, 11, the frictional force Fr of the hystereses error due to the friction of the rotary bearing 13 is added to, or subtracted from, the weight W, W1, W2. The frictional force Fr is, thus, eliminated, respectively calculated out, from the weight measuring of weight W, W1, W2.

For calibrating the weight measuring system of an electromechanical fill-level measuring device, a freely hanging displacement elements 5 with a defined mass m, m1, m2 is hung on the measurement wire 4 for ascertaining its weight W, W1, W2. After each change of the freely hanging displacement elements 5 of predefined mass m, m1, m2, a predefined rotational movement 10, 11 of the measurement drum (8) is performed, and the ascertained weights W, W1, W2 used as calibration values for the weight measuring system.

The measurement drum 8 is rotated by means of the predefined rotational movement 10,11 in at least one or in both rotational directions with a defined angular velocity O, with a defined angular acceleration a and/or with a defined rotated distance dx, so that the displacement element 5 always rises and/or sinks by the same rotated distance dx with the same rotational velocity O. From this procedure, especially for compensating the frictional force Fr of the rotary bearing 13 of the measuring shaft 12 of the measurement drum 8, at least in the calibration mode of the weight measuring system of the electromechanical fill-level measuring device 1, an algorithm calculates the frictional force Fr out of the current ascertaining of the weight W, W1, W2, in that the weight difference dW, dW1, dW2, $dW_{up}$, $dW_{down}$ in both rotational directions of the predefined rotational movement 10, 11 of the measurement drum 8 is ascertained and, from this weight difference dW, dW1, dW2, $dW_{up}$, $dW_{down}$, the frictional force Fr is ascertained, respectively eliminated.

The invention claimed is:

1. An electromechanical fill-level measuring device, comprising:
    at least one displacement element, which is connected by means of a measurement wire windably at least with a measurement drum;
    at least one measuring shaft, with which said measurement drum is mechanically fixedly connected, wherein the shaft is held rotatably in at least one rotary bearing;
    at least one weight measuring system, which ascertains the effective weight of said displacement element and said measurement wire; and
    a servomotor, which is coupled with said measuring shaft and which rotates said measuring shaft corresponding to an ascertained weight measurement, so that an ascertaining of the relative movement of said measurement drum produced by a change of the liquid level to be measured is provided, wherein:
    a calibration mode of said weight measuring system of the electromechanical fill-level measuring device is provided, in which a plurality of freely hanging displacement elements with defined mass, each having a different mass, are provided for ascertaining their weights on said measurement wire; and
    after each change of the freely hanging displacement elements with defined mass a predefined rotational movement of said measurement drum is provided, and their ascertained weights are provided as calibration values for the weight measuring system.

2. The electromechanical fill-level measuring device as claimed in claim 1, wherein:
    a displacement element with a defined first mass is provided on said measurement wire.

3. The electromechanical fill-level measuring device as claimed in claim 1, wherein:
    said freely hanging measurement wire without a displacement element hung thereon is provided as a second mass.

4. The electromechanical fill-level measuring device as claimed in claim 1, wherein:
    a displacement element with a defined second mass, which is different from the first mass, is provided on said measurement wire.

5. The electromechanical fill-level measuring device as claimed in claim 1, wherein:
    said predefined rotational movement of said measurement drum is provided in both rotational directions.

6. The electromechanical fill-level measuring device as claimed in claim 1, wherein:
    said predefined rotational movement of said measurement drum is provided with a defined angular velocity, a defined angular acceleration and/or a defined rotated distance.

7. The electromechanical fill-level measuring device as claimed in claim 1, wherein:
    an algorithm is provided at least in the calibration mode of said weight measuring system of the electromechanical fill-level measuring device for compensating and for calculating out of the current ascertaining of the weight the frictional force of the rotary bearing of said measuring shaft of said measurement drum.

8. A method for calibrating the weight measuring system of an electromechanical fill-level measuring device, comprising: at least one displacement element, which is connected by means of a measurement wire windably at least with a measurement drum; at least one measuring shaft, with which said measurement drum is mechanically fixedly connected, wherein the shaft is held rotatably in at least one rotary bearing; at least one weight measuring system, which ascertains the effective weight of said displacement element and said measurement wire; and a servomotor, which is coupled with said measuring shaft and which rotates said measuring shaft corresponding to an ascertained weight measurement, so that an ascertaining of the relative movement of said measurement drum produced by a change of the liquid level to be measured is provided, wherein: a calibration mode of said weight measuring system of the electromechanical fill-level measuring device is provided, in which a plurality of freely hanging displacement elements with defined mass, each having a different mass, are provided for ascertaining their weights on said measurement wire; and after each change of the freely hanging displacement elements with defined mass a predefined rotational movement of said measurement drum is provided, and their ascertained weights are provided as calibration values for the weight measuring system;
    the method comprising the steps of:
    freely hanging displacement elements with defined mass for ascertaining their weight on the measurement wire; and
    after each change of the freely hanging displacement elements with predefined mass a predefined rotational movement of the measurement drum is performed, and the ascertained weights are used as calibration values for the weight measuring system.

9. The method for calibrating the weight measuring system of an electromechanical fill-level measuring device as claimed in claim 8, further comprising the step of:
    rotating the measurement drum by means of the predefined rotational movement in at least one or in both rotational directions with a defined angular velocity, a defined angular acceleration and/or a defined rotated distance.

10. The method for calibrating the weight measuring system of an electromechanical fill-level measuring device as claimed in claim 9, further comprising the steps of:
    using an algorithm at least in the calibration mode of the weight measuring system of the electromechanical fill-level measuring device for compensating the frictional force of the rotary bearing of the measuring shaft of the measurement drum; and
    calculating the frictional force out of the current ascertaining of the weight.

11. The method for calibrating the weight measuring system of an electromechanical fill-level measuring device as claimed in claim 10, wherein:
    the frictional force of the rotary bearing of the measuring shaft of the measurement drum is calculated out of the current ascertaining of the weight by the algorithm at least in the calibration mode of the weight measuring system of the electromechanical fill-level measuring device by ascertaining the weight difference in both rotational directions of the predefined rotational movement of the measurement drum and ascertaining the frictional force from this weight difference.

* * * * *